United States Patent [19]

Jain et al.

[11] Patent Number: 4,902,088
[45] Date of Patent: Feb. 20, 1990

[54] INTEGRATED OPTIC DEVICE FOR LASER BEAM SCANNING

[75] Inventors: Anil K. Jain, New Brighton; Warren T. Boord, Brooklyn Park; Steven M. Arnold, Minneapolis; Muhammad A. Khan, White Bear Lake, all of Minn.

[73] Assignee: APA Optics, Inc., Blaine, Minn.

[21] Appl. No.: 170,141

[22] Filed: Mar. 18, 1988

Related U.S. Application Data

[63] Continuation-in-part of Ser. No. 843,718, Mar. 25, 1986, abandoned.

[51] Int. Cl.⁴ .............................................. G02B 6/10
[52] U.S. Cl. .............................. 350/96.14; 350/96.13
[58] Field of Search .............. 350/96.11, 96.12, 96.13, 350/96.14

[56] References Cited

U.S. PATENT DOCUMENTS

| | | | |
|---|---|---|---|
| 3,284,722 | 11/1966 | Gray | 331/94.5 |
| 3,795,433 | 3/1974 | Channin | 350/96 WG |
| 3,801,185 | 4/1974 | Ramaswamy et al. | 350/160 R |
| 3,802,761 | 4/1974 | Giallorenzi | 350/96 WG |
| 3,883,220 | 5/1975 | Taylor | 350/96 WG |
| 4,002,898 | 1/1977 | Milton | 250/199 |
| 4,006,963 | 2/1977 | Baues et al. | 350/96 C |
| 4,008,947 | 2/1977 | Baues et al. | 350/96 C |
| 4,130,342 | 12/1978 | McMahon | 350/96.14 |
| 4,172,630 | 10/1979 | Burns et al. | 350/96.14 |
| 4,198,116 | 4/1980 | Papuchon | 350/96.14 |
| 4,243,295 | 1/1981 | Alferness | 350/96.14 |
| 4,291,939 | 9/1981 | Giallorenzi et al. | 350/96.14 |
| 4,375,312 | 3/1983 | Tangonan | 350/96.12 |
| 4,396,246 | 8/1983 | Holzman | 350/96.14 |
| 4,415,226 | 11/1983 | Verber et al. | 350/96.14 |
| 4,420,873 | 12/1983 | Leonberger et al. | 29/576 E |
| 4,421,387 | 12/1983 | Sprague | 350/356 |
| 4,425,024 | 1/1984 | Keil et al. | 350/96.14 |
| 4,439,008 | 3/1984 | Joormann et al. | 350/96.31 |
| 4,462,658 | 7/1984 | Scifres et al. | 350/96.14 |
| 4,466,696 | 8/1984 | Carney | 350/96.20 |
| 4,515,430 | 5/1985 | Johnson | 350/96.13 |
| 4,792,201 | 12/1988 | Suzuki et al. | 350/96.14 |

OTHER PUBLICATIONS

K. L. Chopra, S. Major & D. K. Pandya, Thin Solid Films, vol. 102, No. 1, Apr. 8, 1983.
T. Shiosaki, M. Adachi and A. Kawabala, Thin Solid Films, vol. 96, 129–140 (1982).
K. Tomainaga et al., J. Appl. Physics, 999–1002 (1082).
G. L. Tangonan, et al, Appl. Opt. 17, 3259 (1976).
K. E. Bean: IEEE Trans. Elec Devices-25, 1185 (1972).
I. P. Kaminow, E. H. Turner, Linear Electro-Optical Materials in "Handbook of Lasers" (R. J. Presley, ed.) pp. 447–459, Chemical Rubber Company, Cleveland, Ohio 1971.

(List continued on next page.)

Primary Examiner—Frank Gonzalez
Attorney, Agent, or Firm—Merchant, Gould, Smith, Edell, Welter, Schmidt

[57] ABSTRACT

An integrated device (10) for scanning a laser beam, including a substrate (12). An electro-optic waveguide (14), a Bragg grating electrode array (31) in operative contact with the waveguide, and a array of electro-optic prisms (33). The electrode array (31) includes a plurality of upper grating electrodes (26) and a lower first electrode (32). A voltage potential can be placed across individual upper grating electrodes (26) and the lower electrode (32) to establish up a Bragg grating in a small localized region. This localized Bragg grating diffracts a laser beam carried by the waveguide and creates a spatially-variable diffracted beam (40) which can be continuously scanned by deflecting the diffracted beam (40) with the electro-optic prism array (33). The integrated device can also perform two dimensional scanning by including an array of small period diffraction gratings (61), to diffract the laser beam (24) out of the plane of the waveguide film (14), or an array of hologram facets (51) to map a set of points defined by the hologram facets (51) into a two-dimensional matrix of points.

22 Claims, 3 Drawing Sheets

OTHER PUBLICATIONS

C. S. Tasai, B. Kim, F. R. El-Akkari: IEEE J QU-14,513 (1978).

S. J. Ingtrey, W. D. Westwood, Y. C. Cheng, and J. Wei, "Variable Refractive Index and Birefringent Waveguides by Sputtering Tantalum in Ox-Nx Mixtures," Applied Optics, 14 p, 2194, 1975.

R. H. Keitch, E. J. West, T. G. Giallorinzi and J. F. Weller, "Sputtering Thin Films for Integrated Optics", Applied Optics, 13, p. 712, 1974.

"Integrated Optics", T. Tamir, editor: Springer Verlag, 2nd Edition (1982), pp. 54–59.

"Thin-Film Laser-to-Fiber Coupler", L. P. Boivin, Applied Optics, vol. 13, No. 2, pp. 391–395, (Feb. 1974).

"Optical Coupling from Fibers to Channel Waveguides Formed on Silicon," J. T. Boyd and S. Sriram, Applied Optics, vol. 17, No. 6, pp. 895–898, (Mar. 15, 1978).

"Scattering Loss Reduction in ZnO Optical Waveguides by Laser Annealing", Subhadra Dutta et al, American Institute of Physics, Appl. Phys. Lett. 39(3), pp. 206–208 (Aug. 1, 1981).

P. K. Cheo, "Thin-Film Waveguide Devices", Applied Physics, vol. 6 (1975).

R. Ulrich, "Efficiency of Optical-Grating Couplers," Journal of the Optical Society of America, vol. 63, No. 11 (Nov. 1973).

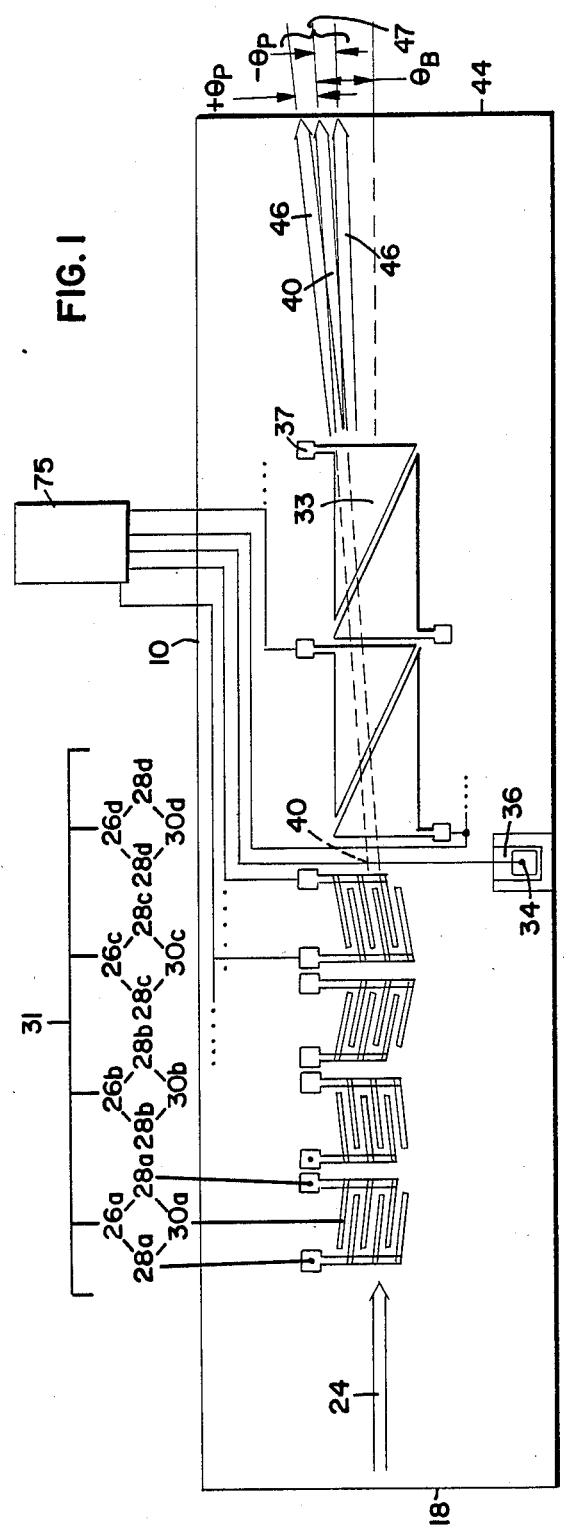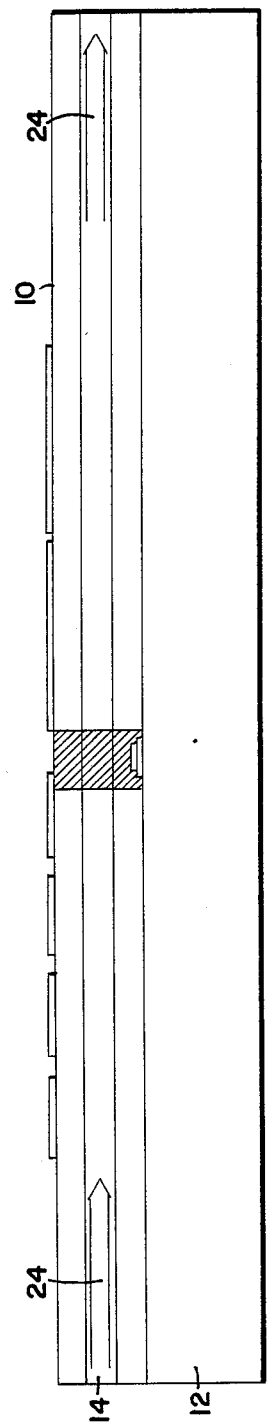

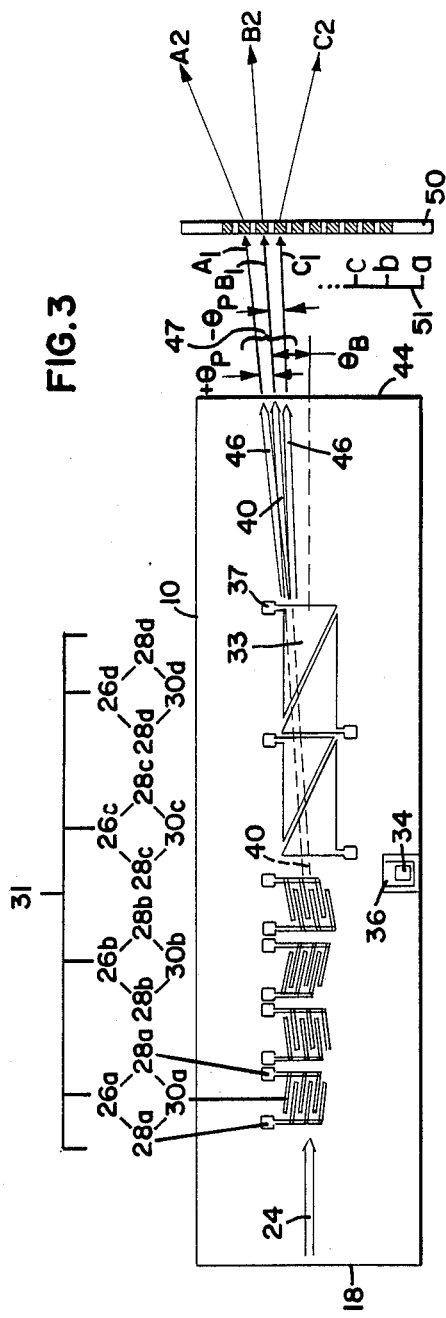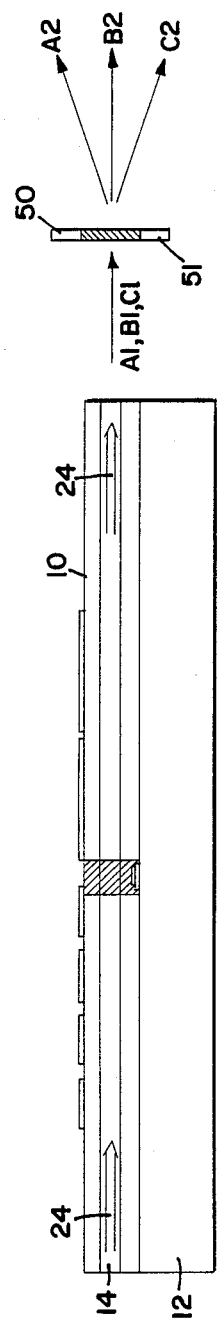

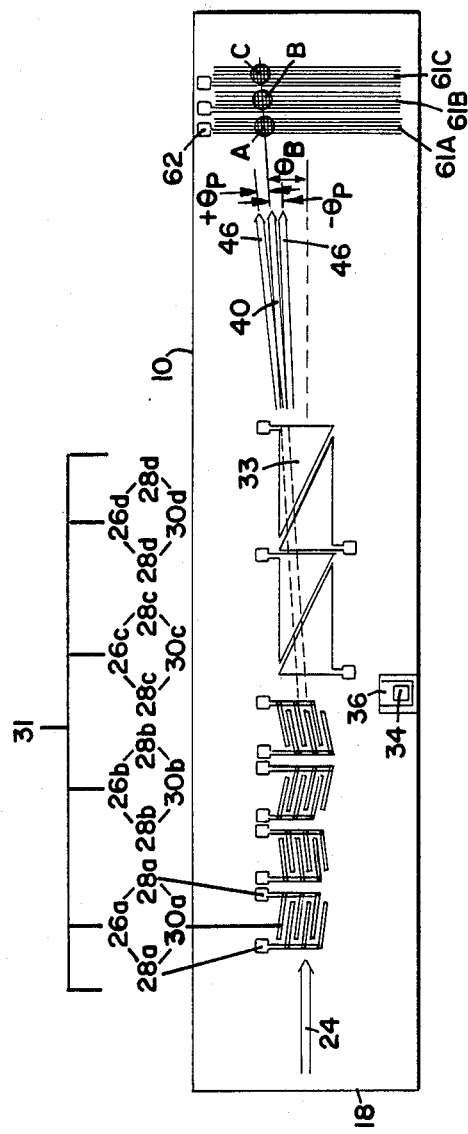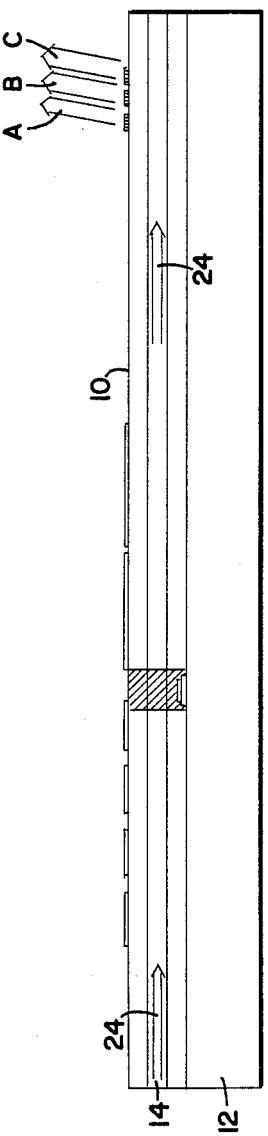

INTEGRATED OPTIC DEVICE FOR LASER BEAM SCANNING

This is a continuation-in-part application of our prior application, Ser. No. 06/843,718, filed Mar. 25, 1986 (now abandoned).

FIELD OF THE INVENTION

This invention relates generally to laser scanning devices, and more particularly to an integrated optic device for laser beam scanning.

BACKGROUND OF THE INVENTION

Laser scanning finds many uses in the area of information handling, and is finding applications that were only partially anticipated twenty years ago. These include non-impact printing, color imaging, digitizing, marking, range finding, laser radar, phototypesetting, electronic mail, bar code reading, optical inspection, optical character recognition, robotic vision and quality control.

Most scanning systems are mechanical, utilizing a motor to rotate a mirror, prism, or holographic grating. Mechanical scanners have generally demonstrated good performance, but they are relatively large and massive. The large inertia of such systems could make their performance sensitive to accelerations.

Acousto-optic beam scanners are also available. However, with a fixed position of the input beam to such a scanner, the obtainable output beam deflection angles are very limited. Acousto-optic deflectors also have limited resolution.

Thus, there is a need for a solid state scanning device which would offer the benefits of reduced size and mass, no moving parts, improved reliability, low cost and low power requirement. A solid state laser scanning device of small size, mass, power requirement, and cost would not only be an attractive replacement for mechanical and acousto-optic systems, but would also make possible many more applications.

SUMMARY OF THE INVENTION

Accordingly, the present invention is directed toward an integrated optic device for scanning a laser beam, including (a) a substrate; (b) a waveguide supported by the substrate suitable for guiding the laser beam, comprising an electro-optic layer; (c) a Bragg grating electrode array in operative contact with the waveguide comprising a plurality of grating electrodes, wherein the grating electrodes can be individually selected and energized to change the refractive index of the electro-optic layer over a small localized region to create a spatially-variable diffracted beam; and (d) an electro-optic prism triangular electrode array in operative contact with the waveguide, wherein the triangular electrodes can be individually selected and energized to change the refractive index of the electro-optic layer over a localized region to create a deflected beam which can be continuously scanned throughout an angular range dependent on the maximum refractive index change possible.

In a preferred embodiment of a scanner constructed according to the principles of the present invention, collimated light is injected into a electro-optic waveguide material via end fire coupling. The electro-optic waveguide material system used is determined in part by the optical wavelength at which the device is to operate. As examples, for laser scanners for visible wavelengths, a zinc oxide (ZnO) electro-optic waveguide and a silicon substrate offers many advantages due to the possibility of incorporating integrated electronic circuits on the device chip for controlling operation. For the infrared region, gallium arsenide (GaAs) and aluminum gallium arsenide ($Al_xGa_{1-x}As$) films on GaAs substrates are the preferred material system. However, there are numerous other material system candidates. Lithium niobate ($LiNbO_3$) for visible light laser scanners and the general class of materials designated as class II–VI compounds of the periodic table of elements for infrared light laser scanners are specific potential examples.

For scanners having a zinc oxide waveguide, the optical axis of the zinc oxide is preferably perpendicular to the substrate and the zinc oxide layer is formed by sputtering. The zinc oxide layer may also be formed by epitaxial growth techniques such as chemical vapor deposition.

The Bragg grating and electro-optic prism electrode arrays of preferred scanners is configured such that the individually selectable grating and prism electrodes are immediately atop the waveguide-clad structure. A lower electrode is beneath the waveguide and may be formed as a separate conductive film or as a conducting layer in the substrate. Each Bragg grating electrode atop the waveguide includes a plurality of parallel "fingers" which are in an angled relationship with respect to the laser beam coupled to the waveguide. Each grating has a companion grating which is oppositely aligned, at an equivalent angle, with respect to the laser beam. These companion gratings allow the scanner to scan equivalent amounts in either direction from the laser beam within the plane formed by the electro-optic waveguide.

In the preferred embodiment, several rating sets (i.e., each set consists of a grating and its companion) are used, with each set aligned at different discrete angles with respect to the laser beam. In this manner, a set of discrete points may be scanned with each grating diffracting the laser beam to a discrete angle.

In preferred scanners, the lower electrode includes a low resistivity area, wherein the low resistivity area runs beneath the waveguide and the grating electrodes. However, a single grating electrode-to-electrode (i.e., interdigital) bias technique is also possible wherein the lower electrode and low resistivity area are unnecessary. In the interdigital biasing case, the optical axis of the zinc oxide does not need to be perpendicularly aligned and may lie parallel to the plane of the waveguide film.

Another feature is the scanner's ability to provide a continuous angular scan. The scanner does so by including an electro-optic prism array. The prism array is in series with the Bragg array. Like the Bragg array, the prism array is made up of several prisms with different alignments, each prism having a companion prism. An individual prism of the prism array is made of a triangular shaped electrode deposited on the top surface scanner. Other shapes, however, may be used. Any metal common to semiconductor metallizations may be used, with a titanium barrier layer with a gold conductive layer being the preferred mode.

A further feature of the preferred scanner is its ability to perform a two-dimensional scan. The scanner uses either an array of small period diffraction gratings to diffract the laser beam out of the plane of the waveguide film or an array of hologram facets to map the linear array of facets into a two-dimension matrix of points.

These and other features and advantages of the invention will become apparent from the following detailed description and the accompanying Drawings.

BRIEF DESCRIPTION OF THE DRAWINGS

Referring to the Drawings, wherein like numerals represent like parts throughout the several Figures:

FIG. 1 is a top view of an integrated optic laser beam scanner constructed according to the principles of the present invention;

FIG. 2 is a side view of the scanner of FIG. 1 with portions broken away;

FIG. 3 is a top view of the scanner of FIG. 1 including means to perform two-dimensional scanning constructed according to the principles of the present invention;

FIG. 4 is a side view of the two-dimensional scanner of FIG. 3 with portions broken away;

FIG. 5 is a top view of an alternative embodiment of the two-dimensional scanner of FIG. 3; and FIG. 6 is a side view of the alternative embodiment of the two-dimensional scanner of FIG. 5 with portions broken away.

DETAILED DESCRIPTION OF A PREFERRED EMBODIMENT

FIGS. 1 and 2 illustrate an integrated optic beam scanner generally designated as 10 constructed according to the principles of the present invention. The scanner 10 includes a substrate 12 and a waveguide film 14 supported thereby.

The substrate 12 in the preferred embodiment is constructed so as to support integrated electronics so that the circuit(s) associated with the scanner can be, at least in part, included on the chip incorporating the scanner 10. Gallium arsenide (GaAs) or silicon (Si), for example, could be used as the substrate 12 for this purpose. However, any material capable of supporting the zinc oxide (ZnO) or gallium arsenide (GaAs) may be used.

The waveguide film 14 can be any material which has an acceptable refractive index and which exhibits a sufficiently strong electro-optic effect. For visible light wavelengths, lithium niobate ($LiNbO_3$) or zinc oxide (ZnO) could be used, for example. Zinc oxide is the material of choice primarily because it can be readily sputtered onto a silicon substrate 12, it presents a small impedance to a laser beam, and it exhibits a relatively strong electro-optic effect.

For infrared wavelengths, $Al_xGa_{1-x}As$ or compounds represented as Classes II-IV in the periodical table of elements, could be used, for example. $Al_xGa_{1-x}As$ is preferred because the extensive material development efforts expended have demonstrated the conditions for low loss optical material fabrication.

The thickness of the waveguide film 14 is selected based on the desired modal profile. The thin film thickness can be varied from several hundreds of angstroms for single mode operation to several microns for multimode operation. In the preferred embodiment for a single mode operation using a helium neon laser wavelength, the waveguide film thickness is 2000-3000 angstroms for zinc oxide.

The waveguide film 14 is suitable for guiding light to the remaining components of the scanner 10 by virtue of the fact that the film's refractive index is higher than the refractive index of the cover cladding film and of the substrate cladding film. Light is injected into a first edge 18 of film 14 by any of several demonstrated techniques which are well known in the art, with prism coupling, grating coupling, and end fire coupling being the most frequently used techniques.

The light injected at the first edge 18 of film 14 is preferably collimated. The beam can be collimated by off-chip optical elements or by on-chip thin film lenses. As is well known to those skilled in the art, a planar waveguide lens such as a Luneberg lens can be created by simply varying the thickness of the film 14 in the region of the lens. However, when using a collimated laser beam and a cylindrical lens (not shown), an on-chip or thin film lens is not required.

A guided light beam 24, as represented by the arrow in the Drawings, is directed toward a Bragg grating array. The array 31 preferably includes a plurality of upper electrodes 26 and a lower electrode 32 (not shown). Each upper grating electrode 26 includes an upper contact pad 28 and a plurality of fingers 30. Each of these upper grating electrodes 26 are electrically isolated from one another. The cover clad is therefore typically silicon dioxide for the zinc oxide and $Al_xGa_{1-x}As$ for the aluminum gallium arsenide waveguide material.

Each grating 26 has a companion grating which is oppositely aligned in an equivalent amount with respect to the laser beam. By way of example, grating 26b is the companion grating of grating 26a, while grating 26d is the companion grating of grating 26c. These companion gratings allow the scanner to scan in an equivalent amount in either direction relative to the incident laser beam 24 within the plane formed by the electro-optic waveguide 14.

In the preferred embodiment, several grating sets (i.e., a grating and its companion) are used, with each set aligned at different discrete angles with the laser beam. In this manner, a set of discrete points may be scanned.

The angles at which the fingers of gratings 31 are aligned are dependent upon the maximum deflection angle achieved by the prism array 33. For example, if the prism array 33 is capable of deflecting the laser beam $\theta p$ degrees, then each Bragg grating set must be oriented two $\theta p$ degrees apart in order to provide for a continuous angular scan. This is due to the fact that the diffracted beam 40 is diffracted at twice the angle $\theta$ formed by the incident beam 24 and the fingers of the Bragg grating 26. The pitch of the grating (the distance between the center lines of adjacent fingers) is specified by the Bragg condition, a formula well known in the art.

The lower or first electrode 32 of the Bragg grating array 31 preferably includes a contact pad 34 and a low resistivity section 36. The contact pad 34 is a metallic area which is photolithographically defined atop a dielectric film covering the substrate surface. The low resistivity area 36 can be created by several techniques. For example, by doping a semiconductor to create a low resistivity area. Also, electrically conducting films such as indium tin oxide can be incorporated in the substrate clad layer. Low resistivity area 36 runs beneath the film 14 to the region below the fingers 30 of upper electrodes 26. Thus, the electro-optic film 14 is sandwiched between electrodes 26 and low resistivity area 36. An interdigital top surface electrode structure can also be used to establish an electric field within and parallel to the plane of the electro-optic film. The two possible electrode configurations require different crystallographic orientations of the electro-optic film.

Another feature is the scanner's ability to provide a continuous angular scan. The scanner does so by including an electro-optic prism array 33. The prism array 33 is in series with the Bragg array 31. Like the Bragg array, the prism array 33 is made up of several prisms with different alignments, each prism having a companion prism. An individual prism of prism array 33 is made of a triangular shaped electrode deposited on the top surface scanner 10. Other shapes, however, may be used. Any metal common semiconductor metallizations may be used, with a titanium barrier layer with a gold conductive layer being the preferred mode.

The prism sets should be spaced far enough to minimize capacitive effects. Also, the prism and its companion may be biased such that the prism is biased positively and its companion negatively.

It can therefore be seen that integrated scanner 10 includes a Bragg array 31 consisting of a plurality of Bragg diffraction gratings and an array 33 of triangular electrodes defining electro-optic prisms. Applying a voltage to either the Bragg grating electrodes or the prism electrodes causes the refractive index of the electro-optic film 14 in the region beneath the electrodes to change. This region is the modified index region. With the Bragg gratings, a periodical change in the refractive index of the film 14 is created by moving from regions beneath the fingers to regions beneath the area between the fingers. This serves as a diffraction grating for the guided light beam 24. The diffracted beam is labeled with reference numeral 40 in the Drawings.

With the triangular shaped prism electrodes 23, the area in which the refractive index changes is shaped so that the optical path length through the modified index region varies linearly across the width of the guided beam. This variation in optical path length steers or deflects, the guided beam 46 away from the incident-/diffracted beam 40 direction.

As a consequence of the electrically isolated nature of the upper grating electrodes 26, each of the Bragg gratings of array 31 can be activated individually. Each of the Bragg grating elements is designed with a different periodicity and orientation with respect to the incident beam 24 direction. The periodicity is changed based on the orientation in accordance with the Bragg condition as discussed above. In this manner, the diffracted beam can be directed into different angular directions, determined by the periodicity and orientation of the Bragg grating which is activated. Thus, the set of Bragg gratings can be activated to direct the beam 24 into a set of fixed, discrete angles. Therefore, by activating different Bragg gratings in connection with the appropriate electro-optic prisms 33, a continuous angular scan is achieved as next discussed.

The continuous scanning capability of the electro-optic prisms 33 is used to scan the beam through the angular ranges between the set of discrete Bragg grating 31 deflection angles. For example, if the electro-optic prism array 33 can generate a maximum deflection of plus or minus $\theta p$ degrees, then for each angular range outside the range of 0° to $\pm \theta p$, both a Bragg grating 31 and the electro-optic prism 33 must be activated. However, the 0° to $\pm \theta p$ angular range can be scanned by the electro-optic prism array 33 alone.

While the electrical system for activating selected electrodes is not shown other than as illustrated in FIG. 1, those skilled in the art will recognize that any of a large variety of electronic circuits could be used and it will be understood that each of the electrodes are to be properly connected to appropriate circuits so as to operate in their intended manner. And of course, portions or all of such a circuit could be integrated directly on the substrate 12.

The scanner 10 can also include a set of on-chip or off-chip lenses (not shown) which focus the array of scanned beams to illuminate a line in a plane removed from the device chip.

FABRICATION

Still referring to FIGS. 1 and 2 and discussed above, the substrate 12 is preferably a material which can support integrated electronics. A lower electrode 32 is defined photolithographically. The low resistivity region 36 which extends beneath upper grating electrodes 26 is formed by heavily doping the semiconductor substrate 12. Also, an electrically conductive film of indium tin oxide can be embedded in the substrate clad layer for devices utilizing ZnO waveguides.

Typically, in the preferred embodiment, the resulting wafer is 0.015 inches thick. Since the films are much small, the wafer contributes the majority of the thickness.

The film 14 is preferably deposited onto the substrate 12 using a technique which yields epitaxial films or films with crystallographic texture. For visible laser wavelengths, the preferred material for waveguide film 14 is ZnO wherein the optic axis of the ZnO film is perpendicular to the plane of the film. As well known to those skilled in the art, the ZnO can be either reactively sputtered using a zinc metal target or sputtered using a ZnO ceramic target. The ZnO waveguide film 14 is preferably deposited on a silicon substrate 12 which has previously been coated with a dielectric film (e.g., silicon dioxide). Similarly, a dielectric film is deposited over the ZnO to provide electrical insulation.

For infrared laser wavelengths, $Al_xGa_{1-x}As$ is the preferred material system. Both the waveguide 14 and the clad layers can be made of $Al_xGa_{1-x}As$ by varying the aluminum concentration designated by subscript x. Subscript x must be larger for the cladding layers. The $Al_xGa_{1-x}As$ films are preferably deposited on a GaAs substrate using an epitaxial growth technique such as metal organic chemical vapor deposition (MOCVD). The optical axis alignment for this material is such that the waveguide 14 and laser beam 24 is oriented normal to the 110 cleavage planes of the material. Here, 110 refers to the crystalline structure miller indices. The orientation of the plane formed by the x and y axis lies within the plane formed by the waveguide 14, with the light beam 24 forming a 45 degree angle with x axis. The x axis is perpendicular to the plane formed by waveguide 14. Either semiconductor, pn junctions or semiconductor-metal junctions (Schottky barriers), can be used to establish an electric field within the $Al_xGa_{1-x}As$ with application of a voltage.

The substrate contact pad 34, the grating 26, and the triangular contacts defining the electro-optic prisms are photolithographically fabricated. The pad 34, gratings 26, and the triangular shaped electrodes consist of a Ti diffusion barrier and an Au conducting layer. Grating and triangular prism electrodes are deposited atop the cover clad layer. The prisms in the preferred embodiment have a length of several centimeters. However, their size is dependent upon the required field of view among other factors. It should particularly be noted that while the Drawings only show a few gratings and prisms, in an actual scanner there would preferably be many more. A large number of gratings increases the angular field of view of the device. It will be understood, however, that a single grating and prism could scan continuously.

OPERATION

With the structure and fabrication of scanner 10 having been described above, operation of the device can now be described. The contact pads 28, 34 and 37 are connected to a suitable controller 75 (best seen in FIG. 1). The individual grating electrodes 28 and prism electrodes 37 can be individually activated using this controller 75.

Light is injected into the first edge 18 of film 14. This light is collimated by off-chip bulk lenses or by on-chip thin film lenses. The resulting collimated light beam 24 is diffracted by a selected grating electrode 26. That is, a voltage is applied across one of the upper electrodes 26 and the lower electrode 32. The electrically biased fingers 30 of the chosen electrode 26 set up a spatially periodic change in the refractive index of film 14 which causes the collimated beam 24 to diffract in the region of the selected electrode 26. Thus, a diffracted light beam 40 is produced. The angular direction of propagation ($\theta_B$) of the diffracted light beam 40 relative to the incident beam propagation direction 24 depends on which upper grating electrode 26 is activated.

Next, by applying a voltage potential to one or more of the triangular prism electrodes, the angular direction of the diffracted beam 40 can be directed to any value in the range $\theta_B + \theta_p$ to $\theta_B - \theta_p$, depending on the magnitude and sign of the voltage applied to the prism electrode(s). These beams are designated 46. In the preferred embodiment, voltage potentials of up to 80 volts are applied to the electrodes, however, these voltage levels are dependent upon numerous design choices as will be recognized by those skilled in the art.

The deflected light beam 47 is emitted at the second edge 44 emerging out of waveguide 14. The angular direction of emerging beam 47 relative to the incident beam propagation direction 24 depends on which electrode 26 is chosen, and on the magnitude and sign of the voltage applied to the prism electrode(s) 37.

Gratings 26 of grating array 31 can be individually biased electrically, and the prisms 33 individually or simultaneously biased with a ramp voltage to rapidly scan the continuous angle of beams 47 (i.e., from $\theta_B - \theta_p$ through $\theta_B + \theta_p$) Also, by changing the grating 26 of grating array 31 which is energized, in connection with applying a simultaneous ramp voltage to prisms electrode 37, a complete continuous angle may be scanned limited only by the scanner 10 field of view. The field of view may be increased to 180 degrees by adding a sufficient number of Bragg gratings.

TWO DIMENSION LASER SCANNER

The proposed laser scanner concept can be extended to provide for scanning the laser beam over a two dimensional area. FIGS. 3, 4, 5 and 6 describe two device structures for creating a two dimension scan. The scan can therefore be described as having an ability to scan both an X and Y axis. The scanner of FIGS. 3 and 4 utilizes the one dimensional scanner 10 of FIG. 1 with the holographic optical element 50. The holographic optical element 50 consists of a linear array of holographic facets 51a, 51b and 51c. These facets 51 are preferably small areas approximately 1 mm square) with a holographic diffraction pattern defined to direct a beam incident at a specific angle into another angular direction. As described in FIGS. 3 and 4, beams A1, B1 and C1 are propagating in different angular directions in the plane defined by the laser waveguide film 14. Each of these beams is directed incident on a different hologram facet 51a, 51b and 51c. The holographic facets 51 diffract the incident beams A1, B1 and C1 into the progagation directions of beams A2, B2 and C2. As shown in the side view (FIG. 4), these beams (A2, B2, and C2) can lie outside the plane in which A1, B1, and C1 lie. In this manner, a set of points along the angular scan is mapped into a two-dimensional matrix of points. This two-dimensional laser scanner structure provides a lower resolution XY scan, useful for optically interconnecting integrated circuits.

To achieve a higher resolution XY scan as may be needed for laser tracking or laser displays, an alternative embodiment is illustrated in FIGS. 5 and 6. This device uses the basic scanner 10 described above to provide an angular scan in the plane defined by the waveguide film 14 of the scanner 10. A second set of electro-optically activated gratings 61 provide a two-dimensional scan by diffracting each of the incident beams illustrated (46 and 40) out of the plane of the waveguide film 14 at several points along the direction of propagation (beams A, B and C in FIGS. 5 and 6. This alternative embodiment could also incorporate a holographic optical element (not shown) to expand the area covered by the two-dimensional array of scanned laser beams.

The diffraction gratings 61 are defined in a conducting film (metal, transparent oxide semiconductor, or doped semiconductor) which can be deposited on the cover clad layer or be incorporated in the cover clad layers. The grating lines defined by the conductive film are electrically interconnected in smaller groups to contact pads 62 so that localized regions of the electro-optically activated grating 61 can be independently energized. For example, beam A is created by applying a voltage to the first small period grating segment 61A.

Gratings 61 are designed to diffract the guided light beam into a free beam which radiates into the cladding and outer bounding media. A grating in a thin film optical waveguide can diffract free beams into the cladding layers if m = $(G/\lambda)(n_1 \sin\theta_1 - N) = -1, -2, -3, -4 \ldots$, where:

$n_1$ = refractive index of the clad layer;

$\theta_1$ = angle between the direction of propagation in the clad layer and the normal to the clad layer surface;

N = effective refractive index of the waveguide layer;

$\lambda$ = free space wavelength of the guided light; and

G = periodicity of the grating.

By proper specification of G, only one beam will be diffracted in to each of the cladding layers. For visible light wavelengths, G<1 micron. Grating patterns with this small a period can be defined in a photoresist film by interfering two coherent laser beams in the volume of the photoresist film. An example of this procedure is reported in a paper by W.T. Tsang and S. Wange, *Appl. Phys. Letters*, Vol. 24, No. 4 (Feb. 15, 1974, pp. 196-9) which is hereby incorporated by reference. This small period grating pattern in the photoresist film is then transferred to an electrically conductive film by wet or dry etching techniques which are well known in the art. A standard photolithographic process is then used to interconnect segments of the small period grating with the contact pads 62.

It should be emphasized that the present invention is not limited to any particular components, materials or configurations, and modifications of the invention will be apparent to those skilled in the art in light of the foregoing description. This description is intended to provide a specific example of an individual embodiment which clearly discloses the present invention. Accordingly, the invention is not limited to this embodiment or to the use of elements having the specific configurations and shapes as presented herein. All alternative modifications and variations of the present invention which fall within the spirit and broad scope of the appended claims are included.

What is claimed is:

1. A device for scanning a laser beam, comprising:
   (a) substrate
   (b) a waveguide supported by said substrate suitable for guiding the laser beam, comprising an electro-optic layer;
   (c) a Bragg grating electrode array in operative contact with said waveguide, comprising a plurality of grating electrodes, wherein said grating electrodes can be individually selected and energized to change the refractive index of said electro-optic layer over a small localized region to create a spatially-variable diffracted beam at predetermined discrete angles relative to the incident angle of the laser beam; and
   (d) deflecting means, operatively connected to said waveguide, for deflecting the laser beam, wherein said deflecting means changes the refractive index of said electro-optic layer over a localized region by varying a signal to said deflecting means, whereby the diffracted beam is deflected about said discrete angles so as to scan the beam, in a continuous angular manner, between said predetermined discrete angles.

2. The laser beam scanning device of claim 1, wherein said deflecting means are positionally in series with said Bragg grating electrode array and wherein said Bragg grating electrode array comprises at least two Bragg grating electrodes.

3. The laser beam scanning device of claim 1, wherein said deflecting means are oriented and configured so as to intercept said diffracted beam.

4. The laser beam scanning device of claim 2, wherein said deflecting means comprise a triangular electrode disposed over the electro-optic layer.

5. The laser beam scanning device of claim 4, wherein said triangular electrode further includes a companion triangle electrode.

6. The laser bean scanning device of claim 3, wherein the thickness of said waveguide is approximately 2,000–3,000 angstroms when said laser beam wavelength is 0.63 microns.

7. The laser beam scanning device of claim 3, wherein said substrate is silicone and said waveguide is zinc oxide.

8. The laser beam scanning device of claim 7, wherein the optical axis of said waveguide is perpendicular to said substrate.

9. The laser beam scanning device of claim 8, wherein said waveguide is formed by sputtering.

10. The laser beam scanning device of claim 3, wherein said waveguide has a first side and a second side, said Bragg grating electrode array further comprising a first electrode on said first side of said waveguide, and wherein said Bragg grating electrode array electrodes are on said second side of said waveguide and each of said Bragg grating electrodes comprises a plurality of fingers oriented at predetermined discrete angles relative to the incident angle of the laser beam.

11. The laser beam scanning device of claim 10, wherein the width of the fingers is specified by:

$$W = \lambda/4 \, N \, \sin \theta$$

where $\lambda$ is the free space wavelength of the laser beam radiation, $N$ is the effective refractive index of the waveguide, $\theta$ is the angle of the fingers relative to the incident laser beam, and wherein the pitch of the grating is twice the width of the fingers.

12. The laser beam scanning device of claim 10, wherein the said first electrode comprises a low resistivity area formed in said substrate and a contact pad in operative contact with said low resistivity area, wherein said low resistivity area runs between said waveguide and said substrate.

13. The laser beam scanning guide of claim 3, further comprising directing means oriented to intercept said deflected beam, for directing said deflected beam out of a plane formed by said electro-optic layer and into a two-dimensional scanning pattern.

14. The laser beam device of claim 13, wherein said directing means comprises a hologram facet.

15. The laser beam device of claim 13, wherein said directing means includes a diffraction grating.

16. The device as recited in claim 1, further comprising controller means, cooperatively connected to said Bragg grating electrode array and said deflecting means, for supplying a signal to said deflecting means and for selecting and energizing said Bragg grating electrode array.

17. A device for scanning a laser beam, comprising:
   (a) a silicon or gallium arsenide substrate;
   (b) an electro-optic thin-film sputtered zinc oxide, gallium arsenide, or aluminum gallium arsenide waveguide supported by said substrate suitable for guiding the laser beam, wherein said waveguide exhibits an electro-optic effect and has its optical axis aligned in a predetermined direction with respect to said substrate;
   (c) a Bragg grating electrode array comprising a plurality of grating electrodes above said waveguide and a unitary lower electrode below said waveguide formed by a lower resistivity area in said substrate, wherein said grating electrodes each comprise a plurality of angled fingers, and wherein said grating electrodes can be individually selected and energized to create a periodic change in the refractive index of said waveguide over a small localized region to act on the laser beam to create a spatially-variable diffracted beam; and
   (d) a triangular electrode array disposed over the electro-optic layer and in operative contact with said waveguide, wherein said triangle electrodes can be individually selected and energized to change the refractive index of said electro-optic layer over a localized region to create a deflected beam which can be continuously scanned through an annular range dependent on the maximum refractive index change possible.

18. The device for scanning a laser beam of claim 17, further comprising directing means oriented to intercept said deflected beam, for directing said deflected beam out of a plane formed by said electro-optic layer and into a two-dimensional scanning pattern.

19. The device for scanning a laser beam of claim 18, wherein said directing means comprises a hologram facet.

20. The device for scanning a laser beam of claim 18, wherein said directing means comprises a diffraction grating.

21. A device for providing a continuous angular scan of a laser beam over a field of view, comprising:
   (a) a substrate;
   (b) a waveguide supported by said substrate suitable for guiding the laser beam, comprising an electro-optic layer;
   (c) diffracting means in operative contact with said waveguide for selectively intercepting and diffracting the laser beam to a predetermined discrete angle within the field of view by changing the refractive index of said electro-optic layer, wherein a segment is formed within the field of view between the laser beam diffracted at a predetermined discrete angle and the incident laser beam propagation direction, wherein said incident laser beam propagation direction is defined as incident to said diffracting means; and
   (d) deflecting means in operative contact with said waveguide and in positional series with said diffracting means for intercepting and deflecting the diffracted beam in a continuous angular manner through said segment.

22. A method for converting an incident received laser beam into a continuous angular deflected beam, comprising the steps of:
   (a) injecting the laser beam into an electro-optic waveguide;
   (b) diffracting the incident laser beam to a predetermined discrete angle relative to the incident laser beam by individually selecting and energizing a Bragg grating electrode from a plurality of Bragg grating electrodes, wherein the refractive index of a small localized region of said electro-optic waveguide is changed to diffract the laser beam at discrete angles; and
   (c) deflecting the diffracted laser beam by changing the refractive index of said electro-optic waveguide over a localized region, by varying a voltage potential supplied to a triangular electrode disposed over said electro-optic layer, to deflect the beam in a continuous angular manner between the predetermined discrete angles.

* * * * *